(12) United States Patent
Ording

(10) Patent No.: US 6,396,520 B1
(45) Date of Patent: May 28, 2002

(54) METHOD OF TRANSITION BETWEEN WINDOW STATES

(75) Inventor: Bas Ording, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/477,738

(22) Filed: Jan. 5, 2000

(51) Int. Cl.$^7$ ............................................. G06F 3/00
(52) U.S. Cl. ................. 345/798; 345/788; 345/799; 345/781; 345/803; 345/804
(58) Field of Search ................. 345/798, 803, 345/804, 802, 800, 788, 799, 672, 681, 682, 660, 666, 667, 779

(56) References Cited

U.S. PATENT DOCUMENTS

| | | | |
|---|---|---|---|
| 5,353,391 A | * 10/1994 | Cohen et al. | 345/619 |
| 5,461,716 A | 10/1995 | Eagen et al. | 345/788 |
| 5,475,812 A | * 12/1995 | Corona et al. | 345/807 |
| 5,546,620 A | 8/1996 | Cline et al. | 345/800 |
| 5,657,463 A | 8/1997 | Bingham | 345/799 |
| 5,724,475 A | * 3/1998 | Kirsten | 386/109 |
| 5,771,032 A | 6/1998 | Cline et al. | 345/786 |
| 5,784,045 A | 7/1998 | Cline et al. | 345/672 |
| 5,796,402 A | * 8/1998 | Ellison-Taylor | 345/792 |
| 5,821,930 A | 10/1998 | Hansen | 345/702 |
| 5,838,318 A | * 11/1998 | Porter et al. | 345/790 |
| 6,020,887 A | * 2/2000 | Loring et al. | 345/781 |
| 6,229,550 B1 | * 5/2001 | Gloudemans et al. | 345/435 |

OTHER PUBLICATIONS

"Window Closing Animations" IBM Technical Disclosure Bulletin, US, IBM Corp. New York vol. 38, No. 11, Nov. 1, 1995, p. 13.*

"OS/2: Contextual Animated—Open Window Control" IBM Technical Disclosure Bulletin, US, IBM Corp. New York vol. 34, No. 11, Apr. 1, 1992, pp. 68–69.*

International Search Report Completed Mar. 28, 2001 and Mailed Apr. 5, 2001.*

* cited by examiner

Primary Examiner—Raymond J. Bayerl
Assistant Examiner—Cuong T. Thai
(74) Attorney, Agent, or Firm—Burns, Doane, Swecker & Mathis, L.L.P.

(57) ABSTRACT

The present invention relates to a method for manipulating a window within a graphical user interface (GUI) of an operating system in a manner that provides a transitional effect between window states, which is pleasing to the user. This transitional effect includes changing the shape of a window while scaling and moving the window between two different sizes and positions. In one embodiment of the present invention, the transitional effect may be employed as a window is minimized into an icon, or restored from an icon. In another embodiment of the present invention, the transitional effect is employed as a window is minimized within its title bar, or restored therefrom. The transitional effect may achieve scaling by a variety of filtering techniques including pixel averaging and pixel removal.

20 Claims, 6 Drawing Sheets

METHOD OF TRANSITION BETWEEN WINDOW STATES

FIELD OF THE INVENTION

The present invention relates generally to graphical user interfaces for computer systems. More particularly, the present invention relates to the resizing and reshaping of windows within a graphical user interface of a computer operating system.

BACKGROUND OF THE INVENTION

An important aspect of virtually every conventional personal and business computer is the graphical user interface (GUI). It is, primarily, the GUI that the user employs to interact with the computer. Typically, the GUI consists of a desktop, windows, icons and pull-down as well as pop-up menus.

As stated, GUIs typically employ windows. A window is a portion of the computer display. Most often, it is a rectangular shaped area in which the user can, for example, view information relating to folders and files; interact with software applications; and execute programs. Of course, windows can be opened, closed and physically moved within the computer display.

In addition, a user may have numerous windows opened simultaneously. However, if the user opens several windows, there may be an insufficient amount of space associated with the computer display to show each window in its entirety. Thus, the computer display can become cluttered. To help keep the display appearance organized, methods have been developed which allow windows to appear as though they overlap one another, allowing the user to resize, reshape and/or reposition windows also helps to keep the display appearance organized. An exemplary method for resizing a window is illustrated in U.S. Pat. No. 5,546,520 to Cline et al. Another exemplary method for modifying or resizing a window, as information is being scrolled, is described by U.S. Pat. No. 5,771,032 to Cline et al. An exemplary method for repositioning windows is illustrated in U.S. Pat. No. 5,657,463 to Bingham.

Another common technique that is employed with windows-based GUIs involves "minimizing" and "maximizing" windows. The technique of minimizing and maximizing windows involves resizing and repositioning windows. When minimizing a window, the window is reduced in size to a miniaturized representation of the larger or full-sized window, or to an icon representation. When maximizing a window, the window is enlarged from a miniaturized representation of the window, or an icon representation, to a larger or full-sized window. As one skilled in the art will readily appreciate, a user may initiate the process of maximizing or minimizing a window by selecting an on-screen button, typically associated with the window itself, or by depressing one or more keys on the keyboard.

With respect to manipulating windows (e.g., opening, closing, sizing, repositioning), conventional operating systems primarily focus on efficiency. However, operating systems do not focus on the aesthetics associated with these operations, particulary minimizing, maximizing and restoring operations. Accordingly, it would be desirable to provide more aesthetically pleasing operations, while continuing to provide all of the functionality associated with traditional techniques.

SUMMARY OF THE INVENTION

Based on the previous discussion, it is the primary objective of the present invention to provide an aesthetically pleasing visual effect when repositioning, resizing, or generally manipulating a displayed window.

It is another objective of the present invention to provide an aesthetically pleasing technique that assists the user in associating miniaturized or minimized windows with the corresponding enlarged or maximized windows.

It is another objective of the present invention to direct the user's attention to the ultimate destination of a minimized or maximized window.

The above-identified and other objectives are achieved by obtaining information relating to the on-screen position of a first and a second window, defining a set of curves which connects the first and the second window positions, and then repeatedly scaling and repositioning the first window in such a way that it appears to slide through the curves from the first window position to the second window position. Again, the visual effect of the present invention provides a smooth, aesthetically pleasing effect, during the process of maximizing and minimizing a window, or hiding and restoring a window, which also assists the user in associating a minimized window with the corresponding maximized window as the user can visually follow the transition from one to the other.

Further features of the invention, the advantages offered thereby are explained in greater detail herein after with reference to specific embodiments illustrated in the accompanying drawings.

DETAILED DESCRIPTION OF THE PREFERRED EMBODIMENTS

In the following description, for the purpose of explanation and not limitation, certain details are set forth, such as particular techniques, steps, and system components, in order to provide a thorough understanding of the present invention. However, it will be apparent to those skilled in the art that the present invention may be practiced in other embodiments that depart from these details. In some instances, specific detailed descriptions of well-known concepts and methods have been omitted so as not to obscure the description of the present invention.

Figure 1:
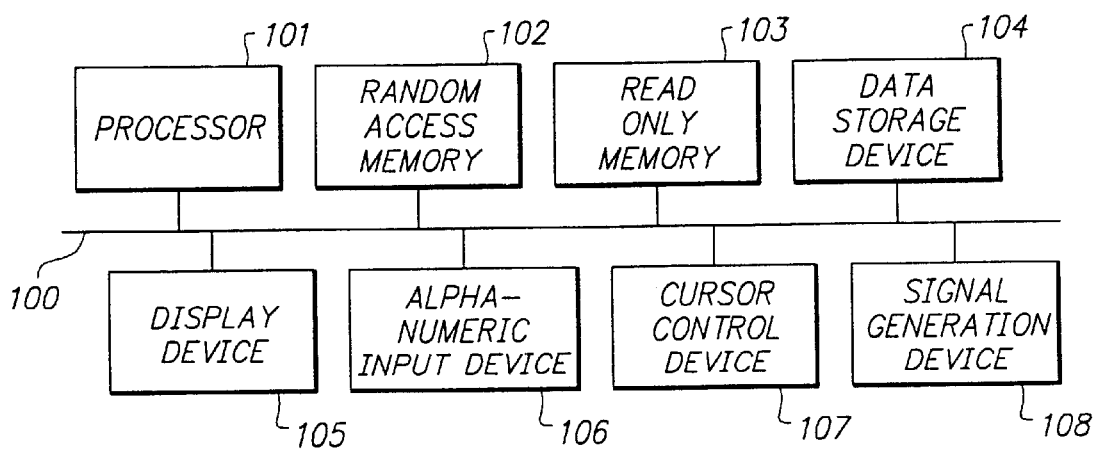
FIG. 1 shows a general computer system on which the present invention may be implemented.

Exemplary embodiments of the present invention may, for example, be implemented on an Apple Macintosh® computer system. In particular, the management of windows can be used with the tool described in U.S. application Ser. No. 09/167,074, filed Dec. 20, 1999, and entitled "User Interface for Providing Consolidation and Access." However, it will be readily appreciated by those skilled in the art that the techniques described herein may be implemented on any of a number of computer systems. In general, such computer systems, as illustrated in FIG. 1, comprise a bus 100 for communicating information, a processor 101 coupled with the bus for processing information and instructions, a random access memory 102 coupled with the bus 100 for storing information and instructions for the processor 101, a read only memory 103 coupled with the bus 100 for storing static information and instructions for the processor 101, a data storage device 104 such as a magnetic disk and disk drive or CD ROM drive coupled with the bus 100 for storing information and instructions, a display device 105 coupled to the bus 100 for displaying information to the computer user, an alpha-numeric input device 106 including alpha-numeric and function keys coupled to the bus 100 for communication information and command selections to the processor 101, a cursor control device 107 coupled to the bus for communicating information and command selections to the processor 101, and a signal generation device 108 coupled to the bus 100 for communicating command selection to the processor 101.

Figure 2C:
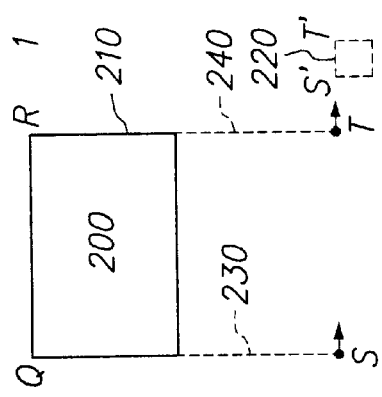
FIGS. 2A–2F illustrate a technique for minimizing and maximizing a window in accordance with exemplary embodiments of the present invention.
Figure 2B:
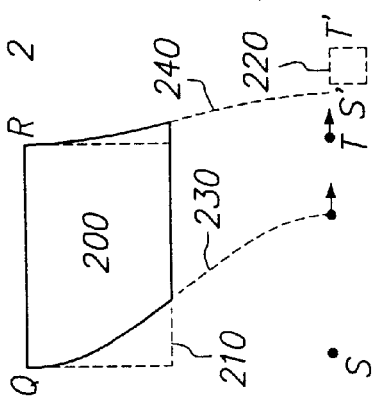
Figure 2A:
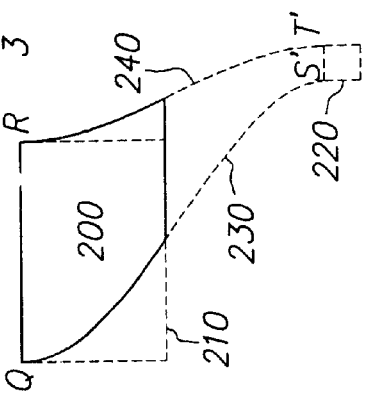
Figure 2F:
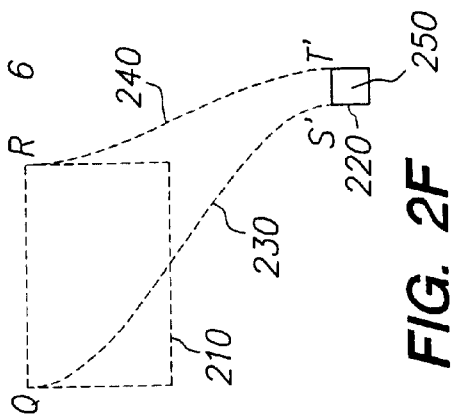
Figure 2E:
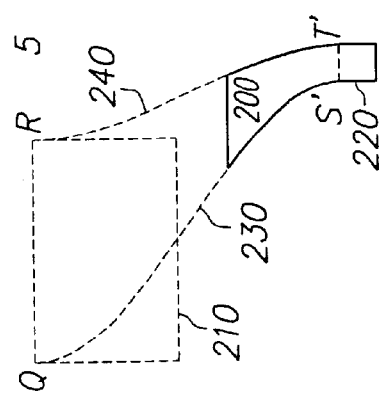
Figure 2D:
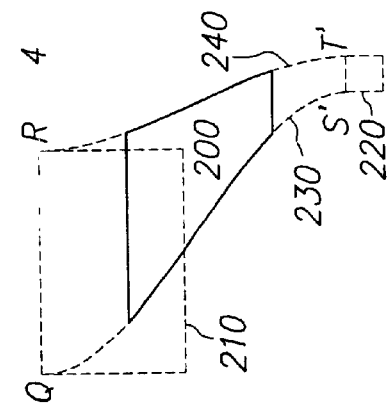

FIGS. 2A–2F graphically illustrate a technique for minimizing and maximizing a window in accordance with an exemplary embodiment of the present invention. More specifically, FIGS. 2A–2F present the visual effect that occurs during the minimizing and repositioning of a window 200 from a first window position 210 to a second window position 220, where the window 200 is minimized, that is, reduced in size to a miniaturized representation 250. It will be understood that the miniaturized window representation 250 may, for example, be an icon representation or, alternatively, a smaller version of the original window 200. To facilitate the explanation of the visual effect illustrated in FIGS. 2A–2F, the technique is divided into a first Phase A and a second Phase B. FIGS. 2A–2C illustrate the events associated with Phase A. FIGS. 2D–2F illustrate the events associated with Phase B.

During a first event, as shown in FIG. 2A, location information defining a first window position 210 and a second window position 220 is obtained. Two curves 230, 240 having amplitudes initially set equal to zero (0), are formed as shown, wherein the two curves 230,240 originate from points Q and R respectively, and terminate at points S and T, respectively. These curves 230, 240 are preferably invisible to the user. In the embodiment shown in FIGS. 2A–2F, points Q and R, from which the two curves 230,240 originate, are selected because they are the points on the corners of the first window position 210, which are most remote from the second window position 220, thereby creating a more dramatic effect in which the window 200 is scaled and moved from the first position 210 to the second position 220. However, the points Q and R, from which the two curves 230,240 originate, can be selected as the points on the corners of the first window position 210 closest to the second window position 220, which would require a shorter set of curves 230,240, and would not require the scaling steps shown in FIGS. 2B–2C.

During a second and third event, as shown in FIGS. 2B–2C, the amplitude of the curves 230,240 is adjusted until the curves 230,240 extend from points Q and R, which are associated with the first window position 210, to points S' and T', which are associated with the second window position 220. As one skilled in the art will appreciate, the curves 230,240 may be defined by any of a variety of different functions. In the example illustrated in FIGS. 2A–2F, the curves 230 or 240 are represented by sinusoidal functions. The basic equation defining curves 230,240 is, therefore, given by equation (1) below:

$$y=A \sin(x) \tag{1}$$

where x represents the length along the initial curves 230, 240 represented by segments QS and RT, shown in FIG. 2A, and where y represents the dimension perpendicular to these segments, in the direction from the points S and T to S' and T', wherein x ranges between $-\pi/2$ and $+\pi/2$ in radians. A is the amplitude which is, for curve 230, increased from zero (0) to a value given by equation (2) below:

$$A=0.5*S\ S' \tag{2}$$

where S S' represents the length along the line connecting point S and point S'. The amplitude A for curve 240 is increased from zero (0) to a value given by equation (3) below:

$$A=0.5*T\ T' \tag{3}$$

where T T' represents the length along the line connecting point T and point T'. As the amplitude A of the curves 230,240 is adjusted, the window 200 is scaled to fit within the curves, as shown in FIGS. 2B and 2C, such that the outer edges are transformed to conform with the adjusted position of the curves 230,240, and the remainder of the image is scaled corresponding to the transformation of the edges.

Scaling the image associated with the window 200, as shown in FIGS. 2B and 2C, may be accomplished by operating on each scan line of the image in a variety of ways. One technique for scaling the image involves filtering the scan lines by averaging adjacent pixels as the size of each scan line decreases. This technique yields a smooth transition in pixel luminance, which is pleasing to the eye. An alternative way of scaling the scan lines is to remove interposing pixels until each line is the correct size. Removing pixels is less processor intensive; however, this alternative technique does not typically produce the smooth transition that is obtained using the averaging technique described above. A variety of other well-known filtering techniques may be used to scale the scan lines, which would be apparent to those skilled in the art, without departing from the spirit of the invention.

While phase A involves defining the curves 230,240 and scaling the window 200 to fit within the curves 230,240, phase B involves moving the scaled window 200 to a second window position 220. As shown in FIGS. 2D–2F, the window 200 appears to slide towards the second position 220. One way of accomplishing this apparent sliding motion is to determine the scaled length of each scan line, as defined by a corresponding distance between curves 230,240, as the scan lines are shifted along a path in the direction from the first window position 210 to the second window position 220, and to scale the scan lines to fit between a corresponding distance between curves 230,240 in transitioning from the first window position 210 to the second window position 220. The scaling of each scan line may be accomplished using the pixel averaging or pixel removing techniques mentioned above. In addition, each scan line is moved and scaled in unison with the other scan lines, which is what creates the appearance that the window 200 is sliding between the curves 230,240 towards its final position 220.

The sixth event depicted in FIG. 2F represents the completion of the window minimization process, where the window 200 has fully completed its apparent sliding motion from the first window position 210 to the second window position 220, and wherein the miniaturized representation of the window 200 is shown as window 250. As stated previously, the window 250 may be a scaled-down version of the original window 200, or an entirely different image, such as an icon. A window represented by an icon is said to be iconified.

A variety of techniques may be used to transform an image to an icon, which may be used to represent the window in its miniaturized form 250, as shown in FIG. 2F. One such technique allows the scan lines associated with the image being minimized to reach a final location within the second position 220 and thereafter disappear, leaving in their place a corresponding scan line associated with the icon. In this way, the forming of the icon gives an appearance similar to filling up a container with a liquid. A variety of other techniques for transforming an image to an icon apparent to those of ordinary skill in the art could be employed without departing from the spirit of the present invention.

After the window has been minimized, it may be restored to its original size and position 210 by reversing the events depicted in FIGS. 2A–2F. In accordance with one embodiment of the present invention, the operating system would retain the values associated with curves 230,240 in memory. Accordingly, there would be no need to recalculate the curves in restoring the window 200 to its original size and position 210 from the position 220 of its miniaturized representation 250.

FIGS. 3A–3F show a number of events associated with a technique for restoring a hidden window 300 in accordance with exemplary embodiments of the present invention. In FIGS. 3A–3F, a hidden window 300 is represented by a title bar 310. One skilled in the art will appreciate, however, that the hidden window may be represented by items other than a title bar, such as, an icon, a thumbnail, etc. Upon restoration of the window 300, the window 300 will occupy a window position 320.

Figure 3A:
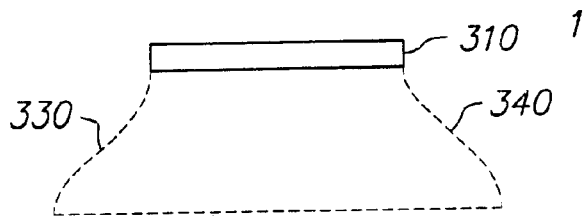
FIGS. 3A–3F illustrate a technique for restoring and hiding a window in accordance with exemplary embodiments of the present invention.

In a first event depicted in FIG. 3A, curves 330,340 are defined, wherein curves 330,340 connect the title bar 310 and the window position 320 by a smooth, continuous curve as shown. The curves 330,340 are preferably invisible to the user. Again, the curves may be defined by a variety of functions. In the present example, the curves 330,340 are defined by a half sine wave function. Unlike curves 230,240 illustrated in FIGS. 2A–2F, curves 330,340 appear inverted (i.e., out-of-phase by $\pi$ radians) with respect to each other. However, one skilled in the art will recognize that the embodiment shown in FIGS. 3A–3F could employ curves that are in-phage with respect to each other, with or without the same amplitude.

Figure 3B:
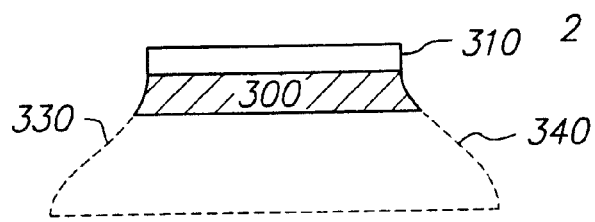
Figure 3C:
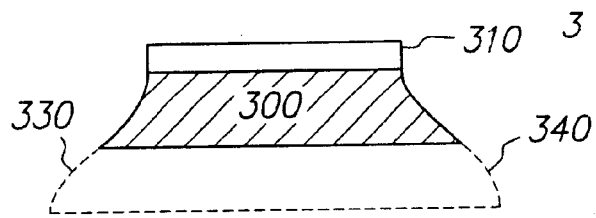
Figure 3D:
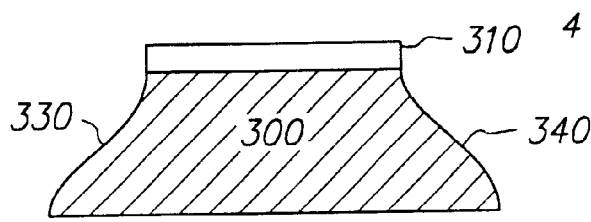

During a second and third event, as shown in FIGS. 3B–3C, the window 200 appears to slide from behind the title bar 310 in a manner similar to the sliding of window 200 described above in conjunction with FIGS. 2D–2F. The window 300 continues to slide one scan line at a time, where each scan line is continuously scaled in accordance with a corresponding distance between the curves 330,340, until the entire image associated with window 300 is completely in view, as exemplified by the fourth event illustrated in FIG. 3D. Again, scaling the scan lines may be achieved by implementing filtering techniques, such as the pixel averaging or pixel removing techniques described above.

Figure 3E:
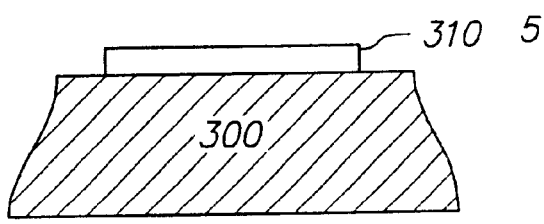
Figure 3F:
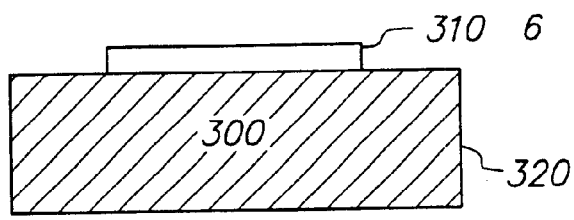

The fifth and sixth events, depicted in FIGS. 3E–3F, show that when the scaled image is completely in view, the amplitude of the curves 330,340 is gradually attenuated to zero (0), until they actually form the two sides of the window 300. As the curves 330,340 are being adjusted, the image of the window 300 is scaled accordingly so that it continues to fit exactly within the curves 330,340. The scan lines may be scaled to fit within the curves 330,340 in accordance with a number of techniques, such as, for example, an extrapolation technique that performs in a manner that is somewhat the reverse of the pixel averaging and/or pixel removing techniques described above.

The events depicted in FIGS. 3A–3F could also be implemented in reverse, thus providing a way to hide the window 300, for example, behind the title bar 310. As in the previous example, the values defining the curves 330,340 may be saved so that they may be easily reused by the operating system when hiding the window 300.

Figure 4A:
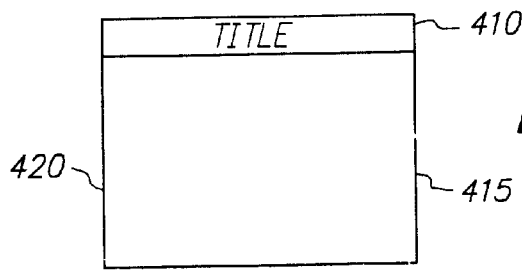
FIGS. 4A–4F illustrate an alternative technique for restoring and hiding a window in accordance with exemplary embodiments of the present invention.
Figure 4B:
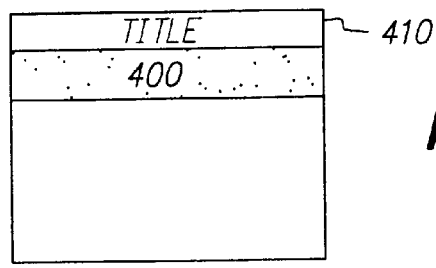
Figure 4C:
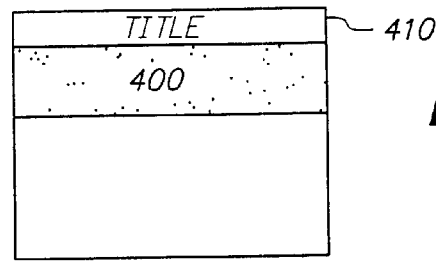
Figure 4D:
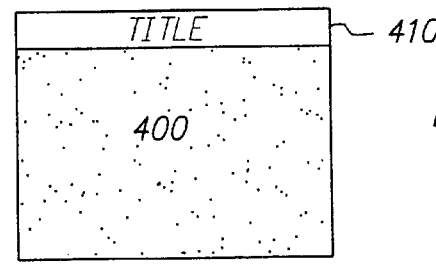
Figure 4E:
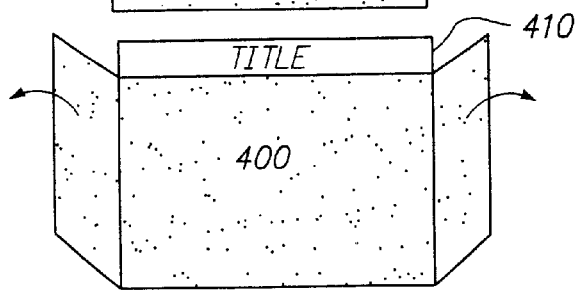
Figure 4F:
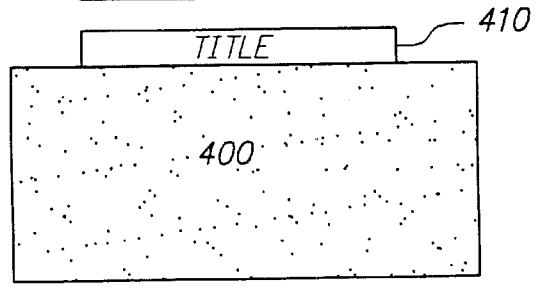

A variety of alternative embodiments involving the restoration of a window, similar to the embodiment illustrated in FIGS. 3A–3F, may be realized. FIGS. 4A–4F illustrate one such alternative. In FIGS. 4A–4C, an initially hidden window 400 is restored from behind a title bar 410 in such a way that it appears to drop down from behind the title bar 410 between the curves 415, 420, which have an amplitude, in this instance, of zero (0). When the window 400 is fully extended, as shown in FIG. 4D, the window 400 appears to "unfold", as illustrated in FIGS. 4E and 4F.

Figures 5A, 5B, 5C, 5D, 5E, 5F:
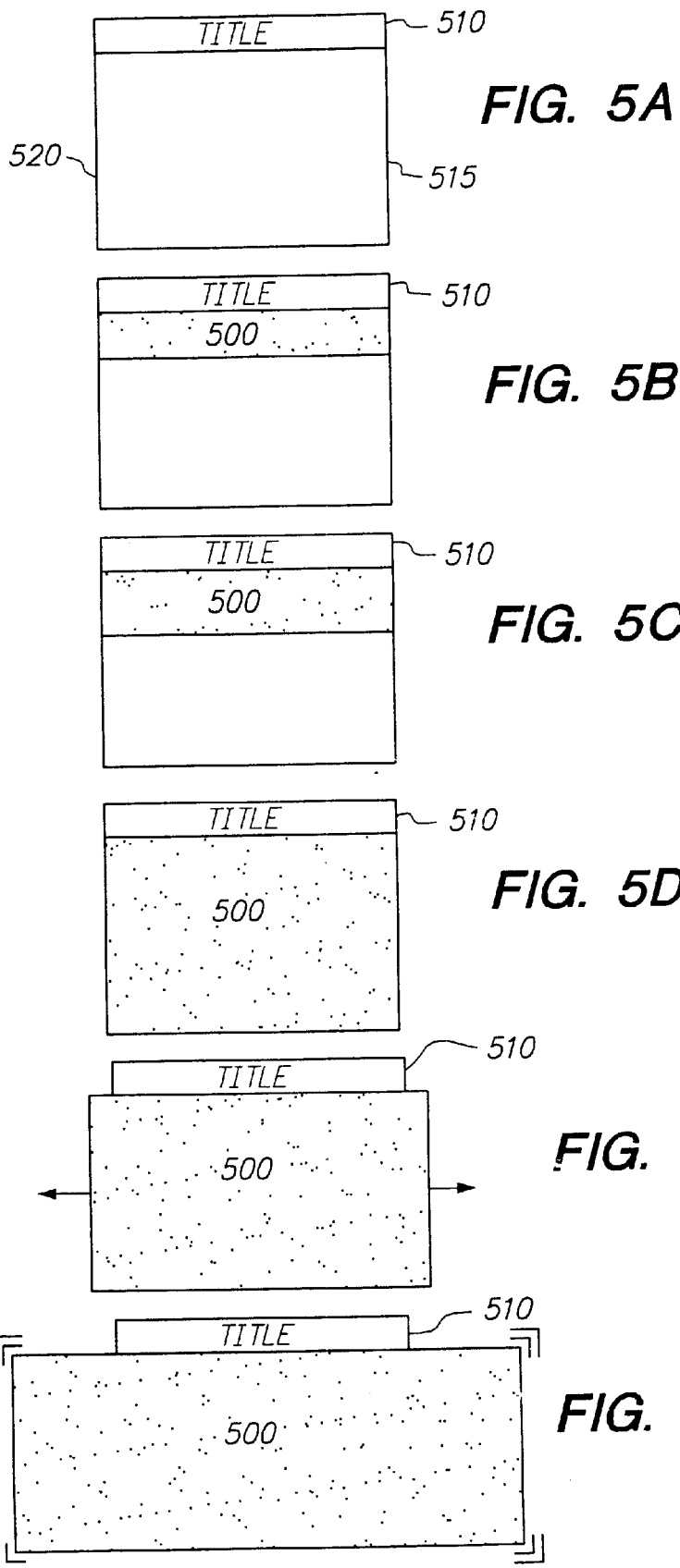
FIGS. 5A–5F illustrate an additional alternative technique for restoring and hiding a window in accordance with exemplary embodiments of the present invention.

FIGS. 5A–5F illustrate still another alternative embodiment. In this case, an initially hidden window 500 is restored in such a way that it appears to drop down from behind the title bar 510, as shown in FIGS. 5A–5C. Once the window 500 is fully extended, as shown in FIG. 5D, the window 500 is expanded horizontally, as shown in FIG. 5E, wherein it appears as though the window undergoes a spring-like vacillation, or bouncing effect, illustrated in FIG. 5F, until it reaches a steady-state as a full-sized window.

Figure 6:
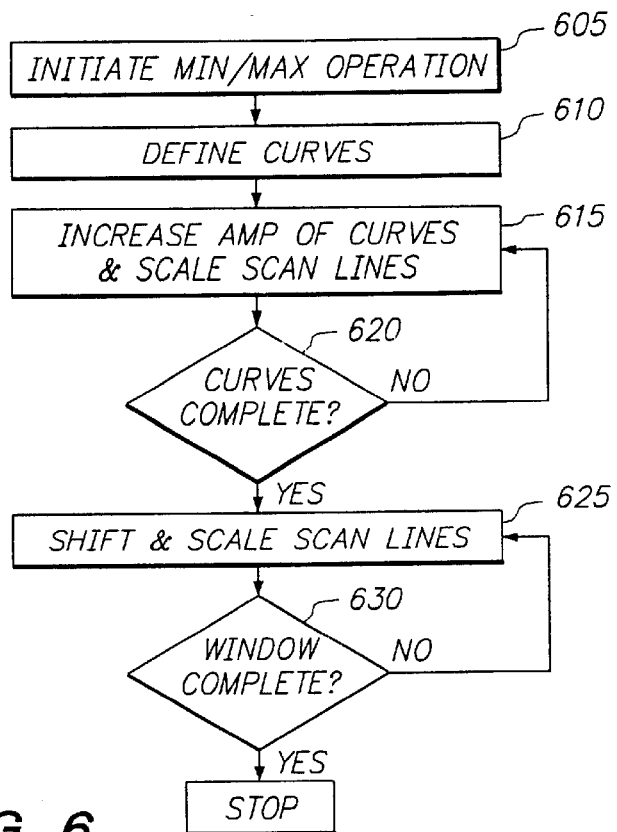
FIG. 6 is a flow chart depicting a method for minimizing and maximizing windows in accordance with exemplary embodiments of the present invention.

FIG. 6 depicts the steps associated with a method that might be employed to implement, for example, the window minimization/maximization technique shown in FIGS. 2A–2F. As shown in step 605, the method begins, of course, with an initiation step. Typically, this is accomplished by the user through the selection of an on-screen button, using a cursor control device, which may be physically associated with the window being minimized/maximized or by the user depressing one or more keys on a keyboard.

In step 610, a pair of curves is defined. In FIG. 2A, these curves 230,240 are designated QS and RT. As previously stated, the curves may be defined by any number of functions. In the examples described above, the curves are defined by half sine wave functions. The curves initially lie along the edges of the window being minimized/maximized, with an amplitude of zero (0).

During step 615, the amplitude of each sine wave curve is incremented, such that the points designated Q and R, which are associated with the present location of the window, appear as though they remain fixed, while the points designated S and T, as illustrated in FIGS. 2A–2C, appear to shift horizontally towards the points designated S' and T', which are associated with the desired location of the window. As the amplitude of each curve is incremented, the scan lines associated with the window are scaled so that they fit within the continuously changing curves. The various techniques that may be employed to scale the scan lines are described above.

After incrementing the amplitude of each curve and scaling the scan lines accordingly, a determination is made, as illustrated by decision step 620, as to whether the amplitude of each curve has been sufficiently increased such that S' and T' are points along each curve respectively. If, as shown by the "NO" path out of decision step 620, the amplitudes have not yet been increased sufficiently, step 615 is repeated. If, however, the amplitudes have been increased sufficiently, as shown by the "YES" path out of decision step 620, then the window begins to move toward its desired location.

In accordance with step 625, the window is moved toward the desired location through a process that involves shifting the window, scan line by scan line, toward the desired location. As the window is being shifted, the scan lines are being continuously scaled so that the length of each scan line equals a corresponding distance between the curves. This creates the appearance that the window is sliding towards the desired location between the curves.

Eventually, each scan line associated with the window reaches the desired location. Thus, as the scan lines are being shifted and scaled, it is necessary to determine whether they have been fully shifted into place such that the window now occupies the desired location. This determination is made in accordance with decision step 630. If it is determined that the scan lines are not fully in place, in accordance with the "NO" path out of decision step 630, step 625 is repeated. If, however, it is determined that the scan lines are fully in place, and the window is now completely occupying the desired location, in accordance with the "YES" path out of decision step 625, the process is complete and the method may be terminated.

Figure 7:
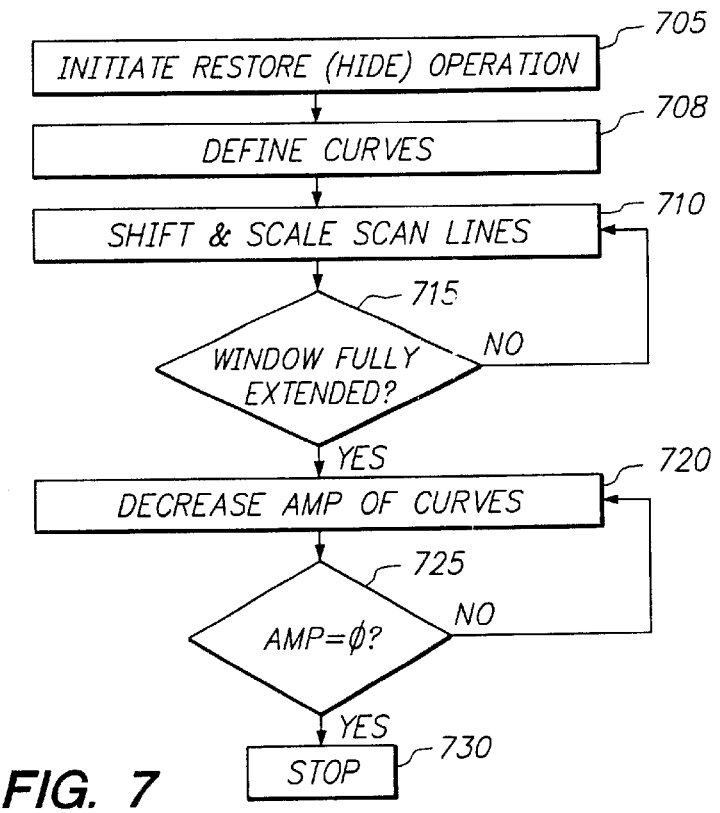
FIG. 7 is a flow chart depicting a method for restoring and hiding a window in accordance with exemplary embodiments of the present invention.

FIG. 7 depicts the steps associated with a method that might be employed to implement, for example, the window restoration technique shown in FIGS. 3A–3F. As shown in step 705, the method begins with an initiation step. As in the previously described method, the user may initiate the method by selecting an on-screen button or depressing one or more keys on a keyboard.

In step 708, a pair of curves is defined. In FIG. 3A, these are identified as curves 330 and 340. The curves, are once again, defined in the present example by half sine wave functions. However, the sine wave functions here have the same amplitudes, though they are inverted with respect to each other, that is, they appear as though they are out-of-phase with each other by $\pi$ radians. In the previous example, the two curves appeared to be in-phase with respect to each other, but with different amplitudes.

During the next step 710, the scan lines associated with the window, for example, window 300 illustrated in FIGS. 3B–3F, are shifted and scaled so that they appear to slide from beneath a minimized window representation, such as a title bar, icon or thumbnail, and between the two curves. After shifting and scaling each scan line, a determination is made as to wether the window has been fully extended, as shown in decision step 715. If, as shown by the "NO" path out of decision step 715, it is determined that the window is not yet fully extended, step 710 is repeated. However, if it is determined that the window is fully extended, as shown by the "YES" path out of decision step 715, then the amplitude associated with the curves is decreased, as shown in step 720.

After decreasing the amplitude associated with the curves, a determination is made as to whether the window is fully expanded. This occurs when the amplitude of the curves reaches zero (0). This determination is made in accordance with decision step 725. If the amplitude of the curves is not yet zero (0), as shown by the "NO" path out of decision step 725, then step 720 is repeated. If, however, the amplitude of the curves is zero (0), the window is fully expanded and the method may be terminated, as shown by the "YES" path out of decision step 725 to the termination step 730.

It will be appreciated by those of ordinary skill in the art that the present invention can be embodied in other specific forms without departing from the spirit of the invention or essential characteristics thereof. For example, the invention has been described using curves, between which an image is scaled and along which an image is slid from a first position to a second position; however, it is anticipated that the use of curves may include the use of any kind of curve, including straight lines. Furthermore, the embodiments described show movement in the vertical direction on a computer screen; however, it is anticipated that the present invention may be implemented in any direction on a computer screen. Moreover, multiple scaling effects may be utilized in scaling and sliding the image that would be within the skill of those skilled in the art for enhancing the aesthetic effect of the transition described without departing from the spirit of the invention.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method of manipulating a window, comprising the steps of:

obtaining location information associated with a first window position on a computer screen;

obtaining location information associated with a second window position on the computer screen;

defining a set of curves, wherein said curves connect said first window position to said second window position;

scaling a window located at said first window position to fit within said curves; and moving said window within said curves from said first position to said second position in a manner so as to give the appearance of sliding.

2. The method of claim 1, further comprising the step of adjusting the amplitude of said curves until they connect said first window position and said second window position.

3. The method of claim 1, further comprising the step of continuously scaling said window as it is sliding from said first position to said second position.

4. The method of claim 1, wherein said step of scaling comprises filtering each scan line of said window.

5. The method of claim 4, wherein said step of filtering utilizes a pixel averaging technique.

6. The method of claim 4, wherein said step of filtering utilizes a pixel removing technique.

7. The method of claim 1, further comprising the step of substituting each scan line of said window with a scan line of a different image.

8. The method of claim 1, wherein the image displayed at said first position is a full-sized window.

9. The method of claim 8, wherein the image displayed at said second position is a title bar.

10. The method of claim 8, wherein the image displayed at said second position is an icon.

11. The method of claim 1, wherein the image displayed at said second position is a full-sized window.

12. The method of claim 11, wherein the image displayed at said first position is a title bar.

13. The method of claim 11, wherein the image displayed at said first position is an icon.

14. The method of claim 1, wherein said curves are straight lines.

15. A computer-readable medium containing a computer program that performs the steps of:

obtaining location information for a first window position on a computer screen;

obtaining location information for a second window position on a computer screen;

calculating curves from said first window position to said second window position;

scaling said window to fit within said curves; and sliding a window within said curves from said first position to said second position.

16. The computer-readable medium of claim 15, wherein said computer program further performs the step of:

continuously scaling said window as it is sliding from said first window position to said second window position.

17. The computer-readable medium of claim 15, wherein said step of scaling comprises filtering each scan line of said window using one of a pixel averaging technique and a pixel removal technique.

18. A computer system, comprising:

a display device; and a processor which controls said display device to selectively display a first representation of a window at a first position and a second representation of said window at a second position, and which is responsive to a user input to calculate curves which define a path from said first position to said second position and control said display device to generate a transition from said first representation to said second representation by scaling said window to fit within said curves and moving an image of said window along said path.

19. The device of claim 18, wherein said processor is further configured to continuously scale the scan lines of the image of said window to fit within said curves, and to move the scan lines of the image of said window together within said curves from said first position to said second position, and to communicate the continuously scaled scan lines of the image of said window to said display device.

20. A computer system, comprising:

means for generating a first representation of a window at a first position on a display;

means responsive to a user input for calculating curves to define a path from said first position to a second position on said display;

means for scaling said first representation of a window to fit within said calculated curves; and means for moving the scaled representation of the window along the path defined by said curves from said first position to said second position on said display to create a second representation of said window at said second position on said display.

* * * * *